United States Patent [19]

Huynh-Ba et al.

[11] Patent Number: 5,763,835
[45] Date of Patent: Jun. 9, 1998

[54] GEL-FILLED CLOSURE

[75] Inventors: Thai Huynh-Ba; Harry Yaworski; Michael J. Bontatibus, Jr., all of Newark, Del.

[73] Assignee: Raychem Corporation, Menlo Park, Calif.

[21] Appl. No.: 550,729

[22] Filed: Nov. 1, 1995

[51] Int. Cl.[6] .................................................. H02G 15/113
[52] U.S. Cl. .......................................... 174/92; 174/138 F
[58] Field of Search ............................... 174/92, 76, 77 R, 174/91, 138 F; 439/519, 521

[56] References Cited

U.S. PATENT DOCUMENTS

| | | | |
|---|---|---|---|
| 3,147,338 | 9/1964 | Ekvall et al. | 174/138 |
| 3,183,302 | 5/1965 | Wochner et al. | 174/138 F |
| 3,325,591 | 6/1967 | Wahl | 174/138 |
| 3,484,541 | 12/1969 | Campbel | 174/138 F |
| 3,757,031 | 9/1973 | Izraeli | 174/138 F |
| 3,875,325 | 4/1975 | Anderson et al. | 174/92 |
| 3,879,575 | 4/1975 | Dobbin et al. | 174/92 |
| 4,392,014 | 7/1983 | Trumble et al. | 174/92 |
| 4,451,696 | 5/1984 | Beinhaur | 174/92 |
| 4,643,505 | 2/1987 | House et al. | 339/75 P |
| 4,647,713 | 3/1987 | De Nijs et al. | 174/21 R X |
| 4,701,574 | 10/1987 | Shimirak et al. | 174/93 |
| 4,736,071 | 4/1988 | Hawkins et al. | 174/92 |
| 4,795,857 | 1/1989 | McInnis | 174/138 F |
| 4,818,824 | 4/1989 | Dixit et al. | 174/92 |
| 4,849,580 | 7/1989 | Reuter | 174/92 |
| 4,859,809 | 8/1989 | Jervis | 174/92 |
| 4,880,676 | 11/1989 | Puigcerver et al. | 428/35.7 |
| 4,909,756 | 3/1990 | Jervis | 438/521 |
| 4,935,582 | 6/1990 | Calligaris | 174/92 |
| 4,963,700 | 10/1990 | Olsen et al. | 174/138 F |
| 4,998,894 | 3/1991 | Grovall | 439/521 |
| 5,099,088 | 3/1992 | Usami et al. | 174/76 |
| 5,129,839 | 7/1992 | VanSkiver | 439/367 |
| 5,135,409 | 8/1992 | Thompson | 439/367 |
| 5,313,019 | 5/1994 | Brusselmans et al. | 174/93 |
| 5,347,084 | 9/1994 | Roney et al. | 174/92 |
| 5,397,859 | 3/1995 | Robertson et al. | 174/92 |

FOREIGN PATENT DOCUMENTS

| | | |
|---|---|---|
| 0 328 386 A2 | 8/1989 | European Pat. Off. . |
| 0 328 386 A3 | 8/1989 | European Pat. Off. . |
| WO 89/10648 | 11/1989 | WIPO . |
| WO 92/15128 | 9/1992 | WIPO . |
| WO 92/22116 | 12/1992 | WIPO . |
| WO 95/11543 | 4/1995 | WIPO . |

OTHER PUBLICATIONS

Patent Abstracts of Japan, vol. 95, No. 006 (abstract of JP 07-161395 Yazaki Corp.) (Jun. 1995).

*Primary Examiner*—Kristine L. Kincaid
*Assistant Examiner*—Chau N. Nguyen
*Attorney, Agent, or Firm*—Herbert G. Burkard; Yuan Chao

[57] ABSTRACT

A gel-filled closure for environmentally protecting a connector forming a connection between a cable and at least one electrical component (which may be another cable) is disclosed. The closure includes first and second cavitied bodies, each having two lateral sides and two end sides; a hinge joining the first and second cavitied bodies along a lateral side thereof, such that the cavitied bodies are capable of pivoting around the hinge and closing around the connector and immediately adjacent portions of the cable and the at least one electrical component; a gel substantially filling each of the first and second cavitied bodies; at least one of the cavitied bodies having a flap disposed along the lateral edge thereof distal from the hinge, for directing gel flow in the lateral direction as the first and second cavitied bodies are closed; and locking mechanism for securing the cavitied bodies in a closed position.

12 Claims, 3 Drawing Sheets

GEL-FILLED CLOSURE

TECHNICAL FIELD OF THE INVENTION

This invention relates to a gel-filled closure for environmentally protecting cable connections.

BACKGROUND OF THE INVENTION

When a cable (whether for the transmission of telecommunications signals or electrical power) is connected to another electrical component which can be another cable or other equipment such as switch gear or a transformer, it is customary to strip back the insulation to expose the underlying conductor to make the connection. Connection is effected with a connector which holds the conductors together and establishes electrical contact between them. It is necessary to environmentally protect the connection (the exposed conductors and the connector), particularly against moisture, which can cause short-circuits or, in the case of signal transmission cables, deterioration of signal quality.

Known means for environmentally protecting connections include tapes, elastomeric push-on closures, heat-recoverable (also known as heat-shrink) closures, and cast-resin-closures. Each suffers from a drawback of some kind. Tapes are difficult to apply reliably to complex connector geometries such as branched connections and the wrapping process is labor-intensive. Push-on closures rely on an interference fit between the cable and the closure and may for this reason be difficult to install, requiring an excessive amount of force. Also, they tend to leak and become geometrically complex when applied to branched connections. Heat-recoverable closures require specialized tools (e.g., a torch), which may hazardous in certain environments. Also, a certain amount of craft skill is needed to assure a proper degree of recovery and/or avoid overheating. Cast resin closures entail the inconvenience of mixing, pouring, and curing of a resin into the closure in the field. The curing requirement also means that the connection cannot be disturbed until a threshold level of cure has been attained, holding up subsequent operations.

Debbault et al., U.S. Pat. No. 4,600,261 (1986) (hereinafter Debbault '261") teaches that a gel under compression may be used as a sealing material, with the gel being contained in a suitable closure. Gels offer the advantage of sealing readily around complex substrate geometries and of being re-enterable. Various closure configurations have been proposed, ranging from two separate half-shells, elbows, hinged half-shells (also known as clamshells), and wrap-arounds, as illustrated in Raychem, WO 95/11543 and Roney et al., U.S. Pat. No. 5,347,084 (1994) (hereinafter "Roney '084"). A hinged gel-filled closure is attractive in several respects. It offers the possibility of less craft sensitivity during installation, in some instances one-handed, tool-less installation. Complex connector geometries and cable configurations and sizes are easily accommodated, including branched connections.

Gel-filled hinged closures may have, however, some limitations. Thermal expansion of the gel may permanently deform the closure material, leading to decompression at the gel interfaces. Closures for connections between electrical power cables are especially susceptible to this problem, because the passage of high currents can heat the gel to temperatures as high as 90° C., or even 130° C. Upon closure around the connector, gel may extrude out the side of the closure, resulting in the loss of gel, the prevention of proper compression of the remaining gel, and interference with proper locking of the closure. Internal pressure on the closure exerted by the compressed gel leads to a torsional torque which may deflect the closure and disengage the locking mechanism. During manufacture, a hinged closure is normally laid flat and uncured gel is poured into each half-shell and allowed to cure. The ports through which the cables are to enter the closure must at that time be liquid-impermeable to permit each half-shell to be filled with gel. It has been proposed in Roney '084 to use break-away seals address this issue. However, such seals may be difficult to break during installation of the closure and may need to be cut with a knife, undesirable in involving both an extra tool and an extra step. Also, once broken, the seals may be ineffective barriers against the loss of gel during service, compromising the sealing function. With these problems in mind, we have invented an improved gel-filled closure, as described hereinbelow.

SUMMARY OF THE INVENTION

This invention provides a gel-filled closure for environmentally protecting a connector forming a connection between a cable and at least one electrical component, the closure comprising first and second cavitied bodies, each having two lateral sides and two end sides;

a hinge joining the first and second cavitied bodies along a lateral side thereof, such that the cavitied bodies are capable of pivoting around the hinge and closing around the connector and immediately adjacent portions of the cable and the at least one electrical component;

a gel substantially filling each of the first and second cavitied bodies;

at least one of the cavitied bodies having a flap disposed along the lateral edge hereof distal from the hinge, for directing gel flow in the lateral direction as the first and second cavitied bodies are closed; and locking mechanism for securing the cavitied bodies in a closed position.

In a preferred embodiment, each of the cavitied bodies has a flap, i.e., the first cavitied body has a first flap along the lateral edge thereof distal from the hinge and the second cavitied body has a second flap along the lateral edge thereof distal from the hinge, the first and second flaps overlapping and directing gel flow in the lateral direction as the first and second cavitied bodies are closed.

In another preferred embodiment, each end side comprises a plurality of fingers joined to the immediately adjacent fingers by a frangible membrane. This construction provides the closure with liquid impermeable end sides as it is filled with fluid, uncured gel, thereby containing the uncured gel and preventing it from leaking out, but also with frangible end sides which can accommodate a wide variety of cable diameters when the closure is closed around a cable and associated connector.

BRIEF DESCRIPTION OF THE DRAWING(S)

DESCRIPTION OF THE PREFERRED EMBODIMENTS

Figure 1A:
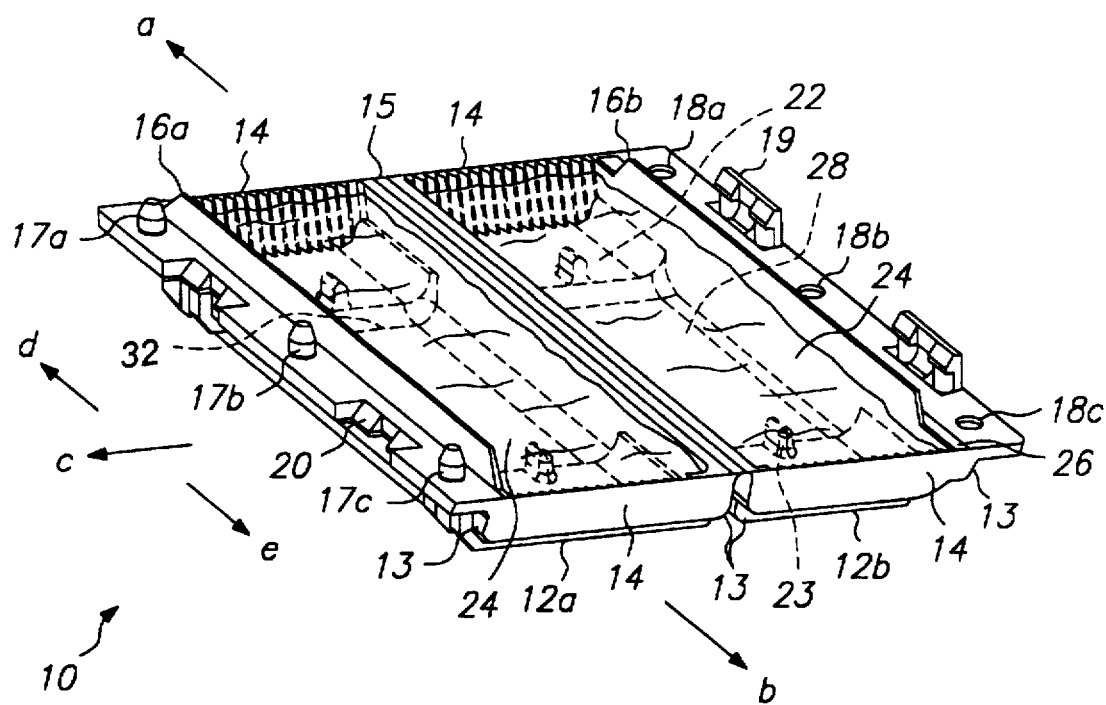
FIG. 1a and 1b show two different views of a closure of this invention.
Figure 1B:
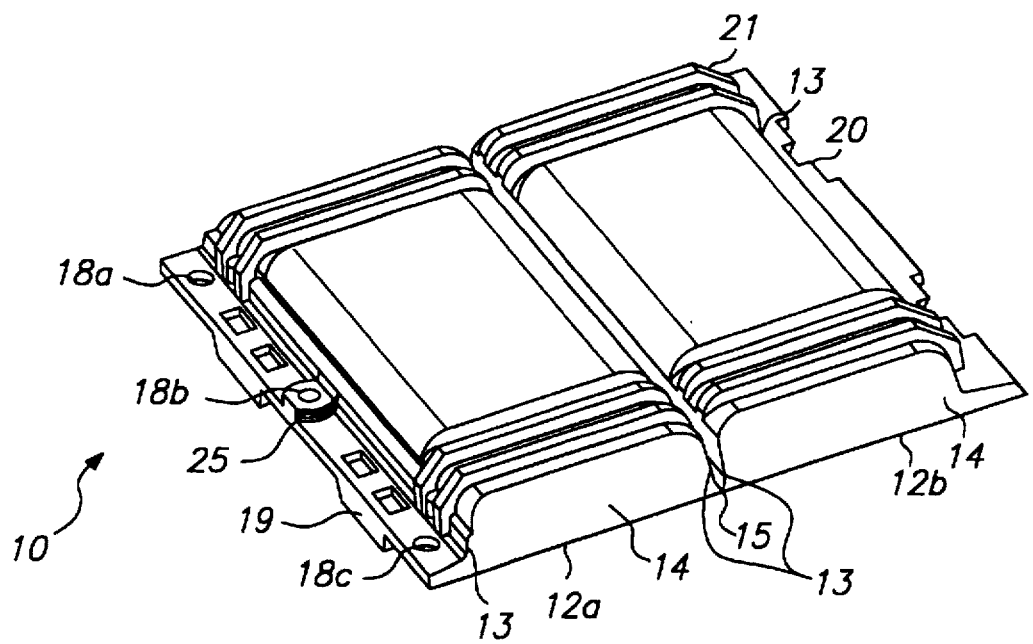

FIG. 1a and 1b show respective top and bottom perspective views of a gel-filled closure 10 of this invention.

Closure 10 has first and second cavitied bodies 12a and 12b, each of which has lateral sides 13 and end sides 14 defining an interior cavity 28. Bodies 12a and 12b are joined to each other along a lateral side 13 by a hinge 15. Hinge 15 is shown here in the preferred embodiment of a living hinge, but other hinge designs such as an integral hinge or a door hinge design are permissible. Bodies 12a and 12b are sized and shaped such that they can pivot about hinge 15 and close to define an enclosed volume inside which can be contained a connector and immediately associated portions of an electrical cable and an electrical component which are electrically connected and held together by the connector, as described hereinbelow. A gel 24 substantially fills each of bodies 12a and 12b. At least one of bodies 12a and 12b has a flap thereon, disposed along the lateral side 13 thereof distal from hinge 15 and projecting above the top level of the cavity. In the preferred embodiment shown, each of bodies 12a and 12b is equipped with a flap, designated as a first flap 16a on body 12a and a second flap 16b on body 12b. When bodies 12a and 12b are closed around the connector and associated cable and electrical component(s), gel 24 is initially squeezed outwards, in the directions indicated by arrows a, b, and c. Excessive flow of gel in direction c tends to interfere with the locking mechanism (described below) and increase the closing force required. However, flaps 16a and 16b overlap each other during the closure operation, act as barriers to gel flow in the c direction, and re-direct gel flow in the lateral direction indicated by arrows d and e. This has the advantageous effect of reducing the closing force and improving the quality of the lateral seal. In the configuration shown, flap 16a overlaps on the outside of flap 16b and body 12b has a groove 26 for receiving flap 16a, but it is to be understood that the mode of overlap and positioning of groove 26 can be reversed. While the exact length of flaps 16a and 16b is not critical, they should be sufficiently long to serve the intended function of damming the undesired lateral flow of gel 24. Preferably, flaps 16a and 16b extend along substantially the entire length of lateral sides 13. Similarly, the width or depth of flaps 16a and 16b is not critical, provided they are of sufficient width to achieve the aforementioned damming function. Where a single flap is used instead of a pair of flaps 16a and 16b, a somewhat wider flap is preferred, for example one which is about twice as wide as it would be when a pair of flaps is used.

Body 12a has a plurality of alignment buttons 17a–17c along distal lateral side 13, while body 12b has a corresponding number of alignment holes 18a–18c. In the preferred embodiment shown here, there are three buttons: button 17a is disposed near one end side button 17c is disposed near the other end side, and button 17b is disposed substantially midway between the other two buttons. However, other numbers and arrangements of buttons may be used. Buttons 17a–17c and holes 18a–18c are sized and positioned such that when bodies 12a and 12b are pivoted around hinge 15 to close them, each button is insert through a corresponding hole, i.e., button 17a through hole 17a, button 17b through hole 17b, etc. A locking mechanism for securing bodies 12a and 12b in a closed position is provided, illustrated here in the preferred embodiment of cantilevered snap joints consist of snap arms 19 and receptacles 20. Other locking mechanisms, such as torsion snap joints, annular snap joints, or the longitudinal pin and pin receptacle design of the aforementioned Roney '084 are permissible (though the latter may not be sufficiently strong in larger closure configurations). Preferably the locking mechanism should be relatively easy to activate, be reversible to permit re-entry, and but yet sturdy enough to prevent accidental opening.

Figure 2A:
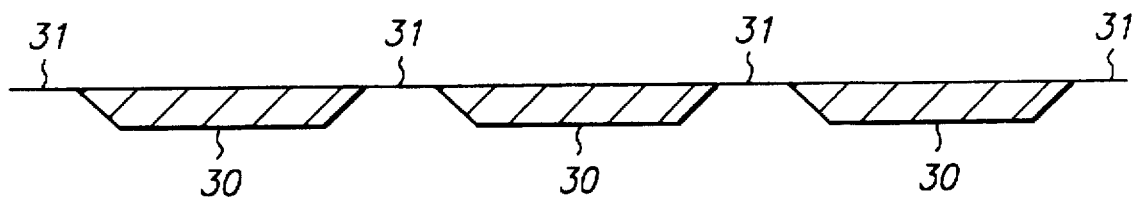
FIG. 2a and 2b show a detail of a closure of this invention.
Figure 2B:
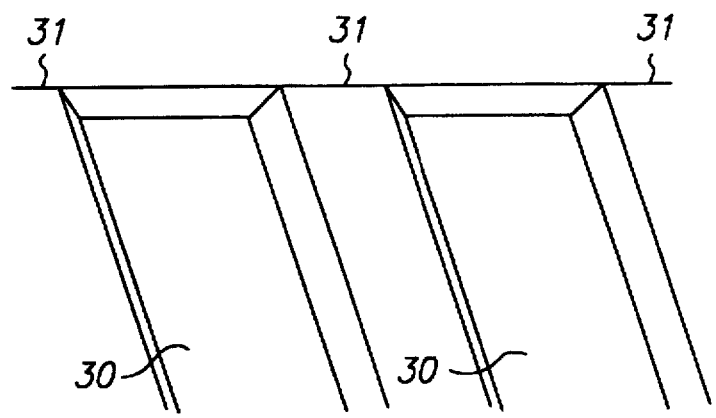

End sides 14 may be frangible, meaning that they rupture upon the closure of bodies 12a and 12b about a connector and associated electrical cable and components, as shown hereinbelow. However, prior to insertion it must form a wall which is liquid impermeable, to permit filling with liquid, uncured, gel precursor(s) which are then cured to form the gel. FIG. 2 shows in magnified cross-section a preferred construction of end sides 14, comprising a plurality of fingers 30 joined to adjacent fingers by frangible membranes 31. FIG. 2b is a perspective view of the same feature. Upon closure of bodies 12a and 12b around a cable or electrical component projecting out of the end sides, membrane 31 is stressed and ruptures or tears, permitting the splaying of fingers 30 to accommodate the cable or electrical component. In a preferred embodiment, fingers 30 are about 0.032 inch thick, while membranes 31 are about 0.002 inch thick.

It is to be understood that closure 10 has been illustrated in the preferred rectangular geometry, i.e., with the lateral sides parallel to each other and perpendicular to the end sides, and vice versa, but that other geometries are permissible. For example, there may be a taper at the end sides, or the distal lateral sides need not be linear but instead can be somewhat curved.

Returning now to FIG. 1, reference is made to some other optional features. Closure 10 may have reinforcing ribs 21 (two pairs per body 12a or 12b shown) which decrease the deflection in the closure near fingers 30 as the enclosed gel expands during service at elevated temperatures, which can be as high as 90° C., thereby helping keep the gel under compression. We have found that relatively heavy ribs, about 0.110 inch wide, are preferred where closure is of a rectangular shape about 1.5 inches wide by 4.5 inches longs. While the instant closure is designed to be amenable to manual closing, it may be preferable to close it by pinching near the center with a pair of pliers. Towards this purpose, a thickened section 25 may be provided surrounding hole 18b to protect button 17b projecting therethrough against damage during the pinching. To prevent opening under torsional torque, it is preferable to chamfer buttons 17a–17c. To distribute stress concentrations more evenly and to increase the opening force, a fillet may be added to the inside of the snap lock arms. Alignment plateaus 22 and dividers 23 may be provided in the interior of bodies 12a and 12b to assist in the positioning of the connector to be enclosed and the associated cable and electrical component parts, and also to hold the same in place. Adding fillets 32 to the intersection of the interior surfaces, for example where the vertical walls of plateaus 22 meets the bottom of bodies 12a and 12b and where the bottom of these bodies meets their lateral sides, helps the gel flow more easily and lower the closing force.

Figure 3A:
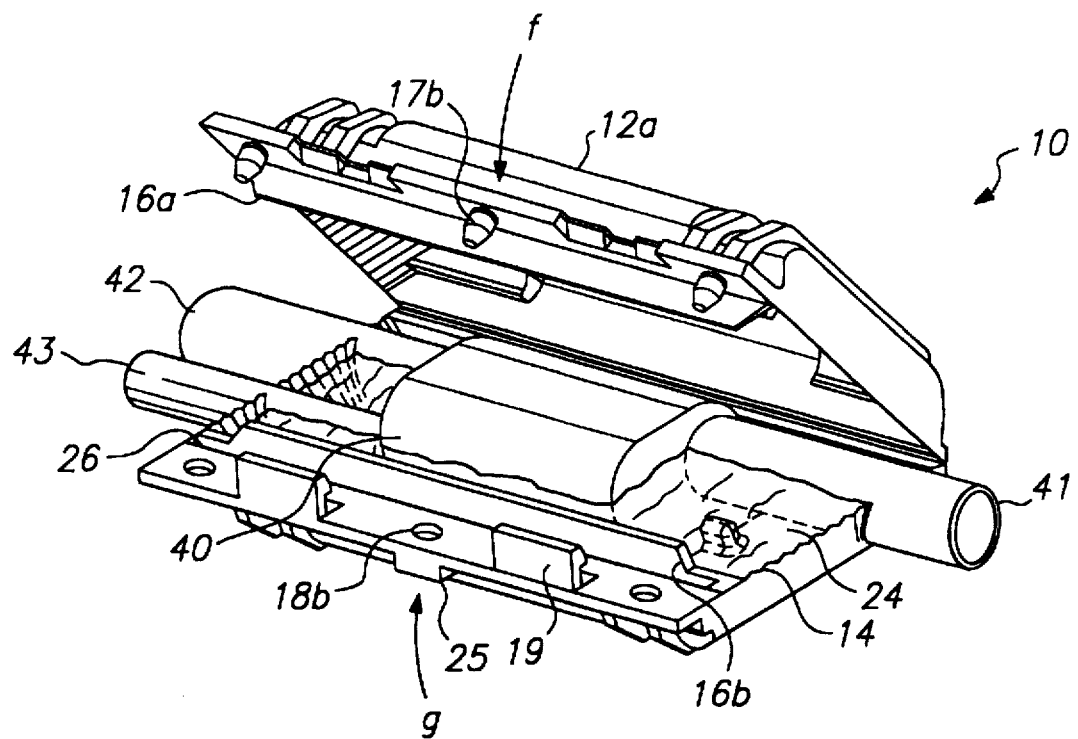
FIG. 3a and 3b show the installation of a closure of this invention over a connector connecting an electrical cable and two other electrical cables.
Figure 3B:
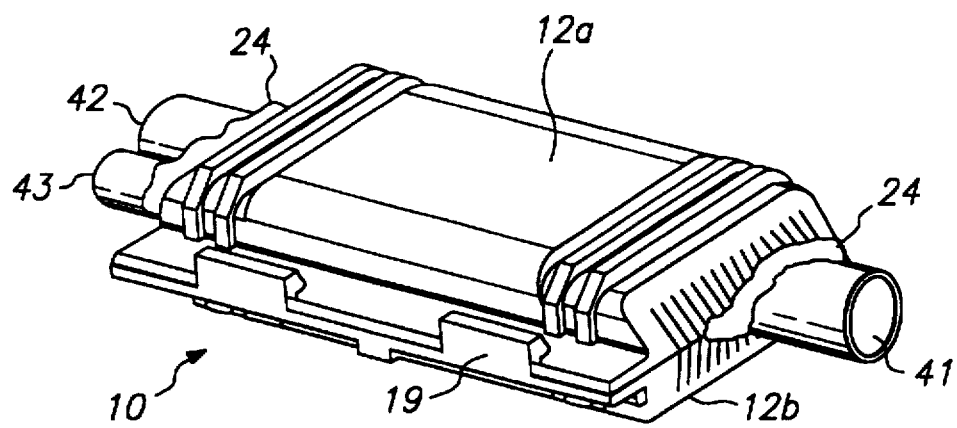

The installation of a closure of this invention is show by FIG. 3a and 3b. FIG. 3a shows a conventional H-frame connector 40, connecting a cable 41 to cables 42 and 43, placed in position inside a closure 10 of this invention. (Numerals repeated from previous figures designate the same elements. To avoid clutter, not all features repeated from previous figures are labeled with reference numerals.) It is to be understood that this particular one-in/two-out configuration is for illustrative purposes only, and that other configurations, such as one-in/one-out, two-in/two-out, etc., are also permissible. Further, cable 41 need not be connected to only other cables, but can be connected to other electrical components, such as switch gear or a transformer. Closure 10 is shown in a partially closed position and may be completely closed by pressing down at the locations indicated by arrows f and g, either manually or with a pair of pliers. As discussed above, flaps 16a and 16b re-direct gel flow in a lateral direction during closure. FIG. 3b shows the closure closed around connector 40 and associated cables 41, 42, and 43. Gel 24 has oozed out along the ends, serving as visible indicia of an effective seal.

The term "gel" has been used in the prior art to cover a vast array of materials from greases to thixotropic compositions to fluid-extended polymeric systems. As used herein, "gel" concerns the category of materials which are solids extended by a fluid extender. The gel is a substantially dilute system which exhibits no steady state flow. As discussed in Ferry, "Viscoelastic Properties of Polymers," 3rd ed. p. 529 (J. Wiley & Sons, New York 1980), a polymer gel is a cross-linked solution whether linked by chemical bonds or crystallites or some other kind of junction. The absence of the steady state flow is the key definition of the solid like properties while the substantial dilution is necessary to give the relatively low modulus of gels. The solid nature is achieved by a continuous network structure formed in the material generally through crosslinking the polymer chains through some kind of junction or the creation of domains of associated substituents of various branch chains of the polymer. The crosslinking can be either physical or chemical as long as the crosslink sites are sustained at the use conditions of the gel.

Preferred gels for use in this invention are silicone (organopolysiloxane) gels, such as the fluid-extended systems taught in Debbault, U.S. Pat. No. 4,634,207 (1987) (hereinafter "Debbault '207"); Camin et al., U.S. Pat. No. 4,680,233 (1987); Dubrow et al., U.S. Pat. No. 4,777,063 (1988); and Dubrow et al., U.S. Pat. No. 5,079,300 (1992) (hereinafter "Dubrow '300"); the disclosures of which are incorporated herein by reference for all purposes. These fluid-extended silicone gels may be created with nonreactive fluid extenders as in the previously recited patents or with an excess of a reactive liquid, e.g., a vinyl-rich silicone fluid, such that it acts like an extender, as exemplified by the Sylgard® 527 product of Dow-Corning or as disclosed in Nelson, U.S. Pat. No. 3,020,260 (1962). Because curing is involved in the preparation of these gels, they are sometimes referred to as thermosetting gels. An especially preferred gel is a silicone gel produced from a mixture of divinyl terminated polydimethysiloxane, tetrakis(dimethylsiloxy)silane, a platinum divinyltetramethyldisiloxane complex (available from United Chemical Technologies, Inc.), polydimethylsiloxane, and 1,3,5,7-tetravinyltetramethylcyclotetrasiloxane (reaction inhibitor for providing adequate pot life). Such a gel has a Voland hardness of between 10 and 20 g, a tack of between 10 and 36 g, and a stress relaxation of less than 55% and is available from Raychem Corporation in conjunction with the GDS Gel Drop Splice Closure, used in coaxial cable television connectors. Such a product is also described in Gronvall, U.S. Pat. No. 4,988,894 (1991), the disclosure of which is incorporated herein by reference for all purposes.

Other types of gels may be used, for example, polyurethane gels as taught in the aforementioned Debbault '261 and Debbault, U.S. Pat. No. 5,140,476 (1992) (hereinafter "Debbault '476") and gels based on styrene-ethylene butylene-styrene (SEBS) or styrene-ethylene propylene-styrene (SEPS) extended with an extender oil of naphthenic or nonaromatic or low aromatic content hydrocarbon oil, as disclosed in Chen, U.S. Pat. No. 4,369,284 (1983); Gamarra et al., U.S. Pat. No. 4,716,183 (1987); and Gamarra, U.S. Pat. No. 4,942,270 (1990). The SEBS and SEPS gels comprise glassy styrenic microphases interconnected by a fluid-extended elastomeric phase. The microphase-separated styrenic domains serve as the junction points in the systems.

The SEBS and SEPS gels are examples of thermoplastic systems. Where a thermoplastic gel is used, the frangible feature of end sides 14 is not needed, as these gels do not require curing.

Another class of gels which may be considered are EPDM rubber based gels, as described in Chang et al., U.S. Pat. No. 5,177,143 (1993). However, these gels tend to continue to cure over time and thus become unacceptably hard with aging.

Yet another class of gels which may be suitable are based on anhydride-containing polymers, as disclosed in copending, commonly assigned application of Mercer et al., no. 08/535,848, filed Sep. 28, 1995 [attorney's docket MP1522-US2], the disclosure of which is incorporated herein by reference. These gels reportedly have outstanding thermal resistance.

The gel may include a variety of additives, including stabilizers and antioxidants such as hindered phenols (e.g., Irganox 1074 (Ciba)), phosphites (e.g., Weston DPDP (General Electric)), and sulfides (e.g., Cyanox LTDP (American Cyanamid)), light stabilizers (e.g., Cyasorb UV-531 (American Cyanamid)), and flame retardants such as halogenated paraffins (e.g., Bromoklor 50 from Ferro) and/or phosphorous containing organic compounds (e.g., Fyrol PCF and Phosflex 390, both from Akzo Nobel). Other suitable additives include colorants, biocides, tackfiers and the like described in "Additives For Plastics, Edition 1" published by D.A.T.A., Inc. and The International Plastic Selector, Inc., San Diego, Calif.

The gel can have a wide variety of hardnesses, as measured by a Voland texture analyzer, from about 1 to about 100 grams, preferably 1 to 30 grams, and stress relaxations preferably less than about 85%. Tack is generally greater than about 1 gram, preferably greater than 5 grams. Hardness, tack and stress relaxation are adjustable for specific applications. Elongation preferably is greater than 50% and more preferably greater than 200–300%. The elongation is measured according to the procedures of ASTM D-638.

The Voland hardness, stress relaxation, and tack are measured using a Voland-Stevens texture analyzer model LFRA, Texture Technologies Texture Analyzer TA-XT2, like machines, having a five kilogram load cell to measure force, a 5 gram trigger, and ¼ inch (6.35 mm) stainless steel ball probe as described in Dubrow '300, the disclosure of which is completely incorporated herein by reference for all purposes. For example, for measuring the hardness of a gel a 60 mL glass vial with about 20 grams of gel, or alternately a stack of nine 2 inch×2 inch×⅛" thick slabs of gel, is placed in the Texture Technologies Texture Analyzer and the probe is forced into the gel at the speed of 0.2 mm per sec to a penetration distance of 4.0 mm. The Voland hardness of the gel is the force in grams, as recorded by a computer, required to force the probe at that speed to penetrate or deform the surface of the gel specified for 4.0 mm. Higher numbers signify harder gels. The data from the Texture Analyzer TA-XT2 is analyzed on an IBM PC or like computer running Microsystems Ltd, XT.RA Dimension Version 2.3 software.

The tack and stress relaxation are read from the stress curve generated when the XT.RA Dimension Version 2.3 software automatically traces the force versus time curve experienced by the load cell when the penetration speed is 2.0 mm/second and the probe is forced into the gel a penetration distance of about 4.0 mm. The probe is held at 4.0 mm penetration for 1 minute and withdrawn at a speed of 2.00 mm/second. The stress relaxation is the ratio of the initial force ($F_i$) resisting the probe at the pre-set penetration depth minus the force resisting the probe ($F_f$ after 1 min divided by $F_i$, expressed as a percentage. That is, percent stress relaxation is equal to $$\frac{(F_i - F_f)}{F_i} \times 100\%$$

where $F_i$ and $F_f$ are in grams. In other words the stress relaxation is the ratio of the initial force minus the force after 1 minute over the initial force. It is a measure of the ability of the gel to relax any induced compression placed on the gel. The tack is the amount of force in grams resisting on the probe as it is pulled out of the gel when the probe is withdrawn at a speed of 2.0 mm/second from the preset penetration depth.

An alternative way to characterize the gels is by cone penetration parameters according to ASTM D-217 as taught in Debbault '261; Debbault '207; Debbault '746; and Debbault et al., U.S. Pat. No. 5,357,057 (1994), each of which is completely incorporated herein by reference for all purposes. Cone penetration ("CP") values range from about 70 ($10^{-1}$ mm) to about 400 ($10^{-1}$ mm). Harder gels generally have CP values from about 70 ($10^{-1}$ mm) to about 120 ($10^{-1}$ mm). Softer gels generally have CP values from about 200 ($10^{-1}$ mm) to 400 ($10^{-1}$ mm), with a particularly preferred range of from about 250 ($10^{-1}$ mm) to about 375 ($10^{-1}$ mm). For a particular materials system a relationship between CP and Voland gram hardness can be developed as taught in Dittmer et al., U.S. Pat. No. 4,852,646 (1989), which is completely incorporated herein by reference for all purposes.

Preferably closure 10 is integrally made of a thermoplastic material, by injection molding. Preferred thermoplastics are propylene polymers, including its homopolymers and copolymers, such as ACCTUF™ polypropylene from Amoco Polymers, Alpharetta, Ga., a copolymer which possesses a good balance of impact resistance, heat resistance and stiffness. Especially preferred are the 3434 and 61-3434X grades of ACCTUF™ polypropylene, which are described by the manufacturer as medium impact, antistatic, nucleated, injection molding materials. Other preferred materials include Crastin PBT grade S600) poly(butylene terephthalate) from Du Pont and Profax polypropylene (grade 6231NW) from Himont. Preferably, the physical properties are a flexural modulus of between 100,000 and 300,000 psi, with between 200,000 and 290,000 psi most preferred (per ASTM D790B), a notched Izod impact value of between 0.5 and 4 ft-lb/in, with between 0.6 and 3.4 ft-lb/in most preferred, at room temperature (per ASTM D256), a heat deflection temperature at 66 psi of at least 200° F. (per ASTM D648), a tensile yield strength of at least 3,500, with between 3,900 and 8,400 psi most preferred (per ASTM D638), and an elongation at break of greater than 50%, most preferably greater than 500% (per ASTM D638). Other suitable thermoplastics include nylon, thermoplastic polyester, polycarbonate, ABS, acetal, poly(phenylene sulfide), and other thermoplastics generally referred to as engineering thermoplastics, filled or unfilled.

While the closure of this invention is especially suitable for the environmental protection of connections involving electrical power cables rated up 1,000 V, where temperature fluctuations to as high as 90° C., or even 130° C., may occur, it is also suitable for connections involving other types of cables, such as cables for the transmission of telecommunications signals, of between a cable and another piece of electrical or electronic equipment, such as a transformer, switch gear, or a signal repeater. The closure of this invention is especially effective at sealing against the ingress of moisture.

By way of illustration of the sealing performance of the closure of this invention, twelve specimens using H-tap compression connectors, six of the 1/0 main and #8 AWG tap type and six of the 2/0 main and #8 AWG tap type, were tested according to ANSI C119.1-1986 (part 4.3). In this test, the specimens were subjected to a series of water immersion, heat conditioning, and cold temperature conditioning tests and their electrical properties were measured at the start of the test, at various intermediate stages, and at the conclusion of the test. Without going into the minutiae of the 17 steps of the test procedure the test generally requires that a specimen have an insulation resistance of at least $1.0 \times 10^6$ ohm at the start and at least $1.0 \times 10^9$ ohm or retention of at least 90% of the starting value upon the conclusion of the test, plus a final AC leakage current of no more than 1000 µA. The specimens started with insulation resistances of between $5.2 \times 10^{11}$ and $3.5 \times 10^{12}$ ohms and ended with insulation resistances of between $1.5 \times 10^{12}$ and $5.0 \times 10^{12}$ ohms, with a leakage current of between 250 and 470 µA.

The foregoing detailed description of the invention includes passages which are chiefly or exclusively concerned with particular parts or aspects of the invention. It is to be understood that this is for clarity and convenience, that a particular feature may be relevant in more than just passage in which it is disclosed, and that the disclosure herein includes all the appropriate combinations of information found in the different passages. Similarly, although the various figures and descriptions thereof relate to specific embodiments of the invention, it is to be understood that where a specific feature is disclosed in the context of a particular figure, such feature can also be used, to the extent appropriate, in the context of another figure, in combination with another feature, or in the invention in general.

What is claimed is:

1. A gel-filled closure for environmentally protecting a connector forming a connection between a cable and at least one electrical component, the closure comprising first and second cavitied bodies, each having two lateral sides and two end sides;

a hinge joining the first and second cavitied bodies along one lateral side of each of the first and second cavitied bodies, such that the cavitied bodies are capable of pivoting around the hinge and closing around the connector and immediately adjacent portions of the cable and the at least one electrical component;

a gel substantially filling each of the first and second cavitied bodies;

a first flap along the lateral side of the first cavitied body distal from the hinge and projecting above the top level of said first cavitied body and a second flap along the lateral side of the second cavitied body distal from the hinge and projecting above the top level of said second cavitied body, the first and second flaps overlapping and directing gel flow in the lateral direction as the first and second cavitied bodies are closed; and locking mechanism for securing the cavitied bodies in a closed position.

2. A gel-filled closure according to claim 1, wherein each of said end sides is frangible.

3. A gel-filled closure according to claim 2, wherein each of said end sides comprises a plurality of fingers joined to immediately adjacent fingers by a frangible membrane.

4. A gel-filled closure according to claim 1 or 3, further comprising a plurality of alignment buttons along the lateral side of the first cavitied body distal from the hinge and a plurality of alignment holes along the lateral side of the second cavitied body distal from the hinge, the alignment buttons and holes being sized and positioned such that when the first and second cavitied bodies are closed, said alignment buttons are inserted through said corresponding alignment holes.

5. A gel-filled closure according to claim 4, wherein the alignment buttons include a first alignment button disposed proximate to one of said end sides, a second alignment button disposed proximate to the other of said end sides, and a third alignment button disposed substantially midway between the first and second alignment buttons.

6. A gel-filled closure according to claim 1 or 3, made of a propylene polymer.

7. A gel-filled closure according to claim 1 or 3, wherein the gel is silicone gel.

8. A gel-filled closure according to claim 1 or 3, wherein the locking mechanism comprises a plurality of snap locks.

9. A gel-filled closure according to claim 1 or 3, wherein the hinge is a living hinge.

10. A gel-filled closure according claim 1 or 3, wherein the at least one other electrical component is an electrical cable.

11. A gel-filled closure according to claim 1 or 3, wherein the interior surfaces in the cavitied bodies intersect at intersections having fillets.

12. A gel-filled closure according to claim 1, wherein each flap extends along substantially the length of the lateral side on which each respective flap is disposed.

* * * * *